(12) United States Patent
Koseoglu et al.

(10) Patent No.: US 9,909,074 B2
(45) Date of Patent: Mar. 6, 2018

(54) INTEGRATED PROCESS FOR IN-SITU ORGANIC PEROXIDE PRODUCTION AND OXIDATIVE HETEROATOM CONVERSION

(71) Applicant: Saudi Arabian Oil Company, Dhahran (SA)

(72) Inventors: Omer Refa Koseoglu, Dhahran (SA); Abdennour Bourane, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 52 days.

(21) Appl. No.: 14/679,495

(22) Filed: Apr. 6, 2015

(65) Prior Publication Data

US 2015/0210943 A1 Jul. 30, 2015

Related U.S. Application Data

(62) Division of application No. 13/191,622, filed on Jul. 27, 2011, now Pat. No. 9,005,433.

(51) Int. Cl.
| | | |
|---|---|---|
| *C10G 27/00* | (2006.01) | |
| *C10G 27/04* | (2006.01) | |
| *C10G 27/10* | (2006.01) | |
| *C10G 45/02* | (2006.01) | |
| *C10G 67/00* | (2006.01) | |
| *C10G 67/16* | (2006.01) | |
| *C10G 27/12* | (2006.01) | |
| *C10G 53/04* | (2006.01) | |
| *C10G 53/14* | (2006.01) | |
| *C10G 67/04* | (2006.01) | |
| *B01J 19/24* | (2006.01) | |
| *C10G 67/12* | (2006.01) | |

(52) U.S. Cl.
CPC ............ *C10G 27/12* (2013.01); *B01J 19/245* (2013.01); *B01J 19/2445* (2013.01); *C10G 27/04* (2013.01); *C10G 53/04* (2013.01); *C10G 53/14* (2013.01); *C10G 67/00* (2013.01); *C10G 67/0418* (2013.01); *C10G 67/12* (2013.01); *C10G 67/16* (2013.01); *B01J 2219/24* (2013.01); *C10G 2300/1096* (2013.01); *C10G 2300/202* (2013.01); *C10G 2300/301* (2013.01); *C10G 2300/4037* (2013.01)

(58) Field of Classification Search
CPC ........ C10G 27/00; C10G 27/04; C10G 27/10; C10G 45/02; C10G 67/00; C10G 67/16
See application file for complete search history.

(56) References Cited

U.S. PATENT DOCUMENTS

| | | |
|---|---|---|
| 1,689,599 A | 10/1928 | Ramage |
| 2,356,980 A | 8/1944 | De Ridder |
| 2,744,054 A | 5/1956 | Pieters |
| 2,749,284 A | 6/1956 | Noble |
| 3,505,210 A | 4/1970 | Wallace |
| 3,594,320 A | 7/1971 | Orkin |
| 3,607,748 A * | 9/1971 | Wilson .................... C10G 53/14 508/317 |
| 3,719,589 A | 3/1973 | Herbstman et al. |
| 3,719,590 A | 3/1973 | Li et al. |
| 3,816,301 A | 6/1974 | Sorgenti |
| 3,891,748 A | 6/1975 | Rosenthal et al. |
| 3,945,940 A | 3/1976 | Leveskis |
| 3,954,879 A | 5/1976 | Wegerhoff et al. |
| 4,051,014 A | 9/1977 | Masologites |
| 4,201,875 A | 5/1980 | Wu et al. |
| 4,359,596 A | 11/1982 | Howard et al. |
| 4,450,303 A | 5/1984 | Drake |
| 4,592,832 A | 6/1986 | Bristow et al. |
| 4,909,927 A | 3/1990 | Bell |
| 5,021,143 A | 6/1991 | Franckowiak et al. |
| 5,110,445 A | 5/1992 | Chen et al. |
| 5,151,530 A | 9/1992 | Marquis et al. |
| 5,276,202 A | 1/1994 | Ceh |
| 5,292,914 A | 3/1994 | Suyama et al. |
| 5,334,771 A | 8/1994 | Ember et al. |
| 5,360,536 A | 11/1994 | Nemeth et al. |
| 5,389,240 A | 2/1995 | Gillespie et al. |
| 5,612,426 A | 3/1997 | Nakano et al. |
| 5,847,052 A | 12/1998 | Hamanaka et al. |
| 5,880,325 A | 3/1999 | Alward et al. |
| 6,166,136 A | 12/2000 | Murakami et al. |
| 6,217,748 B1 | 4/2001 | Hatanaka et al. |
| 6,277,271 B1 | 8/2001 | Kocal |
| 6,491,797 B1 | 12/2002 | Locke et al. |

(Continued)

FOREIGN PATENT DOCUMENTS

| | | |
|---|---|---|
| JP | 2004168663 A | 6/2004 |
| WO | 2001027078 A1 | 4/2001 |
| WO | 200148119 A1 | 7/2001 |
| WO | 2002062925 A2 | 8/2002 |
| WO | 2004015030 A1 | 2/2004 |
| WO | 2005066313 A2 | 7/2005 |
| WO | 2005118476 A1 | 12/2005 |
| WO | 2007103440 A2 | 9/2007 |
| WO | 2008089065 A1 | 7/2008 |
| WO | 2012082684 A2 | 6/2012 |

OTHER PUBLICATIONS

PCT Application No. PCT/US2012/044499, International Seach Report and Written Opinion dated Oct. 4, 2012, 12 Pages.

*Primary Examiner* — Randy Boyer
(74) *Attorney, Agent, or Firm* — Abelman, Frayne & Schwab

(57) ABSTRACT

An oxidative treatment process, e.g., oxidative desulfurization or denitrification, is provided in which the oxidant is produced in-situ using an aromatic-rich portion of the original liquid hydrocarbon feedstock. The process reduces or replaces the need for the separate introduction of liquid oxidants such as hydrogen peroxide, organic peroxide and organic hydroperoxide in an oxidative treatment process.

13 Claims, 11 Drawing Sheets

(56) References Cited

U.S. PATENT DOCUMENTS

| | | |
|---|---|---|
| 6,544,409 B2 | 4/2003 | De Souza |
| 6,576,214 B2 | 6/2003 | Zhou et al. |
| 6,827,845 B2 | 12/2004 | Gong et al. |
| 6,866,772 B2 | 3/2005 | Selai et al. |
| 6,884,337 B2 | 4/2005 | Amdisen et al. |
| 6,995,221 B2 | 2/2006 | Cozens |
| 7,038,090 B1 | 5/2006 | Brandvold et al. |
| 7,276,152 B2 | 10/2007 | Lin et al. |
| 7,297,253 B1 | 11/2007 | Gosling et al. |
| 7,314,545 B2 | 1/2008 | Karas et al. |
| 7,361,792 B2 | 4/2008 | Brandvold et al. |
| 7,666,297 B2 | 2/2010 | Lee et al. |
| 7,678,943 B2 | 3/2010 | Gosling et al. |
| 9,005,433 B2 | 4/2015 | Al-Shahrani et al. |
| 2002/0148754 A1 | 10/2002 | Gong et al. |
| 2004/0006914 A1 | 1/2004 | Shaaban et al. |
| 2006/0180501 A1 | 8/2006 | Da Silva et al. |
| 2007/0138060 A1 | 6/2007 | Palmer |
| 2007/0140948 A1 | 6/2007 | Palmer |
| 2007/0140949 A1 | 6/2007 | Palmer |
| 2007/0140950 A1 | 6/2007 | Palmer |
| 2007/0282140 A1 | 12/2007 | Kortz et al. |
| 2009/0148374 A1 | 6/2009 | Choi |
| 2012/0152804 A1* | 6/2012 | Koseoglu ............... C10G 21/00 208/80 |

\* cited by examiner

INTEGRATED PROCESS FOR IN-SITU ORGANIC PEROXIDE PRODUCTION AND OXIDATIVE HETEROATOM CONVERSION

RELATED APPLICATIONS

This application is a divisional application of U.S. patent application Ser. No. 13/191,622 filed Jul. 27, 2011, the disclosure of which is incorporated herein by reference.

BACKGROUND OF THE INVENTION

Field of the Invention

The present invention relates to integrated oxidation processes to efficiently reduce the sulfur and nitrogen content of hydrocarbons to produce fuels having reduced sulfur and nitrogen levels.

Description of Related Art

The discharge into the atmosphere of sulfur compounds during processing and end-use of the petroleum products derived from sulfur-containing sour crude oil pose health and environmental problems. The stringent reduced-sulfur specifications applicable to transportation and other fuel products have impacted the refining industry, and it is necessary for refiners to make capital investments to greatly reduce the sulfur content in gas oils to 10 parts per million by weight (ppmw), or less. In industrialized nations such as the United States, Japan and the countries of the European Union, refineries for transportation fuel have already been required to produce environmentally clean transportation fuels. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the direction of the United States and the European Union and are moving forward with regulations that will require refineries to produce transportation fuels with an ultra-low sulfur level.

To keep pace with recent trends toward production of ultra-low sulfur fuels, refiners must choose among the processes or crude oils that provide flexibility to ensure that future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters were constructed before these more stringent sulfur reduction requirements were enacted and represent a substantial prior investment. It is very difficult to upgrade existing hydrotreating reactors in these facilities because of the comparatively more severe operational requirements (i.e., higher temperature and pressure conditions) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3000 ppmw sulfur. These units were designed for, and are being operated at, relatively mild conditions, i.e., low hydrogen partial pressures of 30 kilograms per square centimeter for straight run gas oils boiling in the range of 180° C.-370° C.

However, with the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by integrating new reactors, incorporating gas purification systems, reengineering the internal configuration and components of reactors, and/or deployment of more active catalyst compositions. Each of these options represents a substantial capital investment.

Sulfur-containing compounds that are typically present in hydrocarbon fuels include aliphatic molecules such as sulfides, disulfides and mercaptans, as well as aromatic molecules such as thiophene, benzothiophene and its long chain alkylated derivatives, and dibenzothiophene and its alkyl derivatives such as 4,6-dimethyl-dibenzothiophene. Aromatic sulfur-containing molecules have a higher boiling point than aliphatic sulfur-containing molecules, and are consequently more abundant in higher boiling fractions.

In addition, certain fractions of gas oils possess different properties. The following table illustrates the properties of light and heavy gas oils derived from Arabian Light crude oil:

TABLE 1

|  |  | Light | Heavy |
| --- | --- | --- | --- |
| Feedstock Name |  |  |  |
| API Gravity | ° | 37.5 | 30.5 |
| Carbon | wt % | 85.99 | 85.89 |
| Hydrogen | wt % | 13.07 | 12.62 |
| Sulfur | wt % | 0.95 | 1.65 |
| Nitrogen | ppmw | 42 | 225 |
| ASTM D86 Distillation |  |  |  |
| IBP/5 V % | ° C. | 189/228 | 147/244 |
| 10/30 V % | ° C. | 232/258 | 276/321 |
| 50/70 V % | ° C. | 276/296 | 349/373 |
| 85/90 V % | ° C. | 319/330 | 392/398 |
| 95 V % | ° C. | 347 |  |
| Sulfur Speciation |  |  |  |
| Organosulfur Compounds Boiling Below 310° C. | ppmw | 4591 | 3923 |
| Dibenzothiophenes | ppmw | 1041 | 2256 |
| $C_1$- Dibenzothiophenes | ppmw | 1441 | 2239 |
| $C_2$- Dibenzothiophenes | ppmw | 1325 | 2712 |
| $C_3$- Dibenzothiophenes | ppmw | 1104 | 5370 |

Aliphatic sulfur-containing compounds are more easily desulfurized (labile) using conventional mild hydrodesulfurization methods, at mild operating conditions, i.e. hydrogen partial pressure of 10-30 kg/cm², temperatures of 330-360° C., liquid hourly space velocity of 1-4 volume of liquid per volume of catalysts and per hour. However, certain highly branched aliphatic molecules can sterically hinder the sulfur atom removal and are moderately more difficult (refractory) to desulfurize using conventional hydrodesulfurization methods.

Among the sulfur-containing aromatic compounds, thiophenes and benzothiophenes are relatively easy to hydrodesulfurize. The addition of alkyl groups to the ring compounds increases the difficulty of hydrodesulfurization. Dibenzothiophenes resulting from addition of another aromatic ring to the benzothiophene family are even more difficult to desulfurize, and the difficulty varies greatly according to their alkyl substitution, with di-beta substitution being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level is very costly utilizing current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

The development of non-catalytic processes for desulfurization of petroleum distillate feedstocks has been widely studied, and certain approaches are based on oxidation of sulfur-containing compounds described, e.g., in U.S. Pat. Nos. 5,910,440, 5,824,207, 5,753,102, 3,341,448 and 2,749,284. Well known oxidizing agents include gaseous forms of oxygen, such as air or pure oxygen. In addition, it is known to use aqueous oxidant such as hydrogen peroxide, or organic peroxides, as oxidizing agents.

Organic peroxides are a very versatile source of active oxygen atoms and radicals. Radicals are formed after the thermally induced homolysis of the peroxide bond. The major radical-molecule reactions are additions and homolytic bimolecular substitution reaction, e.g. H-abstraction, atom transfer, unimolecular reactions, e.g. decarboxylation, β-scission and rearrangements, e.g. 1,5-H-abstraction. In synthesis reactions, undesired radical-radical reactions such as radical combination and disproportionation can be avoided by proper choice of the type of peroxide and reaction conditions. Another major application of organic peroxides in synthesis is oxidation, which is a non-radical reaction.

There are several important parameters for the selection of peroxide for use in chemical reactions. Physical and chemical stability impacts the storage and handling properties, and the temperature dependent rate of decomposition determines the reactivity at the process conditions. Decomposition products of the peroxides, therefore, must be taken in account during the purification process.

Organic peroxides are well established synthetic agents in the manufacture of many pharmaceutical intermediates, herbicides, insecticides and various other fine chemicals. Organic peroxides offer opportunities to reduce the number of reaction steps in synthetic routes applying classical synthetic procedures.

Organic peroxides combine a number of interesting features for their application in organic synthesis, including high purity, high efficiency, favorable solubility in most organic systems thereby enabling homogeneous reaction conditions, well defined and temperature controlled reactivity, and favorable cost-to-performance ratios.

Organic peroxides can have a variety of characteristics depending on their chemical structure and reactivity. Reactivity of the peroxides depends on the peroxide group configuration and on the type of substituent. Organic peroxides can be classified into different groups depending on their chemical structures, as shown in Table 2:

TABLE 2

| Type of Peroxide | Structure |
| --- | --- |
| Hydroperoxide | $R_1-O-O-H$ |
| Ketone peroxide | $H-O-O-[C(R_1)(R_2)-O-O-]_{n=1,2}H$ |
| Peroxyacid | $R_1-C(=O)-O-O-OH$ |
| Dialkylperoxide | $R_1-O-O-R_2$ |
| Peroxyester | $R_1-C(=O)-O-O-R_2$ |
| Peroxycarbonate | $R_1-O-C(=O)-O-O-R_2$ |
| Diacylperoxide | $R_1-C(=O)-O-O-C(=O)-R_2$ |
| Peroxydicarbonate | $R_1-O-C(=O)-O-O-C(=O)-O-R_2$ |
| Cyclic ketone peroxide | $[-C(R_1)(R_2)-O-O-]_{n=2,3}$ |

Thermally induced homolysis of the peroxidic bonds yield oxy-radicals. The decomposition rate of the peroxides not only depends on the class of peroxide, but also on the type of R-group. Therefore, the reactivity and sensitivity of the peroxides to radical attack, i.e., induced decomposition, is strongly dependent upon its structure.

The thermal decomposition of organic peroxides is a first order reaction. Increase in temperature of about 10° C. results in a 2-3 fold increase in decomposition rate. The decomposition is further accelerated with catalysts possessing high oxidation potential. The half-life times of various organic peroxides varies from 0.1 to 10 hours on a range of temperature from 70° C. to 210° C.

Organic peroxides are commonly associated with safety hazards during experimental preparation and synthesis, storage and transportation. Thus, heightened safety precautions and measures are required when handling organic peroxides. Known safety measures include, cooling the organic peroxides to low temperatures, preparing the organic peroxides in a diluted medium such as water, and/or incorporation of chemical stabilizers. These precautions are necessary to minimize the likelihood of impact shock and thermal influence caused by exothermic reactions.

It would be desirable to provide an oxidative process for converting heteroatoms into their corresponding oxidation products that minimizes the need for safety measures required for handling of organic peroxides.

SUMMARY OF THE INVENTION

An oxidative treatment process, e.g., oxidative desulfurization or denitrification, is provided in which the oxidant is produced in-situ using an aromatic-rich portion of the original liquid hydrocarbon feedstock. The process reduces or replaces the need for the separate introduction of liquid oxidants such as hydrogen peroxide, organic peroxide and organic hydroperoxide in an oxidative treatment process.

In accordance with one or more embodiments, a process for conversion of heteroatom-containing compounds in a hydrocarbon feedstock to their oxidation products is provided. The hydrocarbon feedstock, is separated into an aromatic-lean fraction and an aromatic-rich fraction. The aromatic-rich fraction is contacted with an effective amount of gaseous oxidant under conditions effective for organic peroxide generation and to produce a mixture containing organic peroxide and heteroatom-containing hydrocarbons. The mixture containing produced organic peroxide and heteroatom-containing hydrocarbons is contacted with the aromatic-lean fraction under conditions effective for oxidative conversion of heteroatom-containing hydrocarbons in the mixture and in the aromatic-lean fraction into oxidation products of heteroatom-containing hydrocarbons.

In accordance with one or more additional embodiments, a process is provided for conversion of heteroatom-containing compounds in a hydrocarbon feedstock to their oxidation products. The hydrocarbon feedstock is separated into an aromatic-lean fraction and an aromatic-rich fraction. The aromatic-rich fraction is contacted with an effective amount of gaseous oxidant under conditions effective for organic peroxide generation and to produce a mixture containing organic peroxide and heteroatom-containing hydrocarbons. All or a portion of the aromatic-lean fraction is hydrotreated. The mixture containing produced organic peroxide and heteroatom-containing hydrocarbons is retained under conditions effective for oxidative conversion of heteroatom-containing hydrocarbons into oxidation products of the heteroatom-containing hydrocarbons.

BRIEF DESCRIPTION OF THE DRAWINGS

The foregoing summary, as well as the following detailed description of preferred embodiments of the invention will be best understood when read in conjunction with the attached drawings, in which like reference numerals represent similar elements or operations. For the purpose of illustrating the invention, there are shown in the drawings embodiments which are presently preferred. It should be understood, however, that the invention is not limited to the precise arrangements and apparatus shown, in which.

DETAILED DESCRIPTION OF THE INVENTION

A system and process is provided for conversion of sulfur-containing and nitrogen-containing hydrocarbon compounds to their respective oxidation products by oxidation using in-situ generated peroxides. In-situ generated peroxides compounds are produced from the hydrocarbon feedstock by reacting an aromatic-rich fraction derived from the influent feedstock with one or more gaseous oxidants. The resultant peroxides are used as selective oxidants for conversion of sulfur-containing and nitrogen-containing hydrocarbon compounds to their respective oxidation products, thereby eliminating the requisite transportation, storage and handling expenses conventionally associated with organic peroxides. The oxidation products can be removed by known extraction and/or adsorption processes to produce hydrocarbon products having reduced concentrations of sulfur-containing and nitrogen-containing hydrocarbon mixtures suitable for use as fuels or refinery feedstocks.

Figure 1:
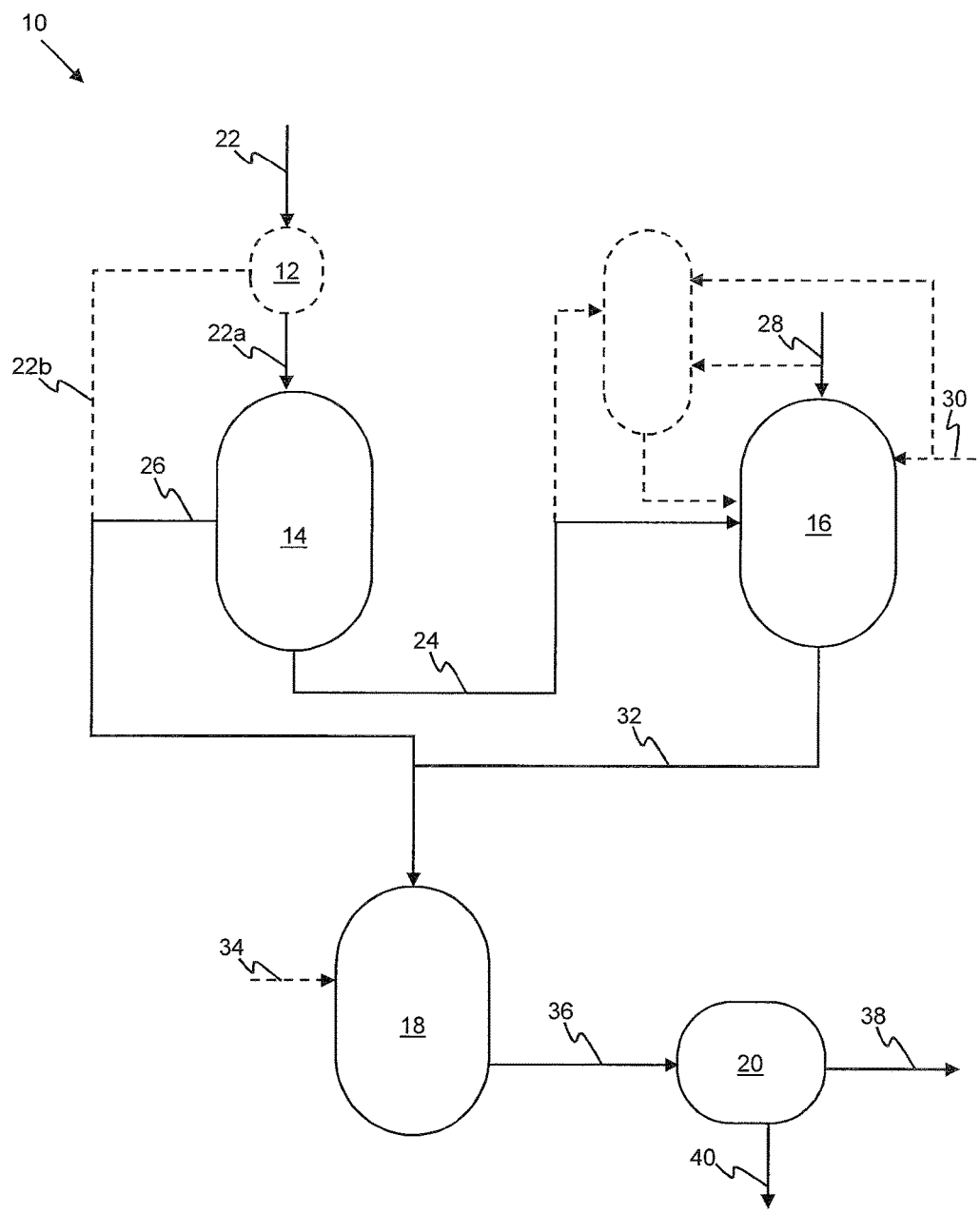
FIG. 1 is a process flow diagram of an integrated process for in-situ generation of organic peroxides and oxidation.

Referring to FIG. 1, an oxidative desulfurization system 10 is shown that generally includes an optional feed separation apparatus 12, an aromatic separation apparatus 14, an organic peroxide generation apparatus 16, an oxidative reaction apparatus 18 and an oxidation product separation apparatus 20.

Feed separation apparatus 12 can be optional as denoted by dashed lines in FIG. 1, and is any suitable apparatus to partition the initial feedstock. It can be a simple diverter to provide a slipstream of a feedstream, a flash separation apparatus to fraction a feedstream based on a temperature cup point, or a distillation unit. In general, feed separation apparatus 12 includes an inlet for receiving a feedstream 22 and plural outlets for discharging streams 22a and 22b (optional as denoted by dashed lines in FIG. 1).

Aromatic separation apparatus 14 generally includes an inlet for receiving stream 22a of feedstock 22 (or the entire feedstock 22 in embodiments in which feed separation apparatus is not employed), an aromatic-rich outlet for discharging an aromatic-rich stream 24 and an aromatic-lean outlet for discharging an aromatic-lean stream 26.

Organic peroxide generation apparatus 16 includes an aromatic-rich inlet for receiving aromatic-rich stream 24, a gas inlet for receiving a gaseous oxidant stream 28, and an oxidant outlet for discharging an effluent 32 including organic peroxide and any unreacted, unconverted or partially converted hydrocarbons and heteroatom-containing hydrocarbons including organosulfur and organonitrogen compounds. In certain embodiments, apparatus 16 contains an effective quantity of heterogeneous catalyst to promote organic peroxide generation. In alternative embodiments (as indicated in FIG. 1 with dashed lines), or in combination with an effective quantity of heterogeneous catalyst, apparatus 16 includes an inlet for receiving an effective quantity of homogeneous catalyst via stream 30.

In additional embodiments (not shown), gaseous oxidant and/or homogeneous catalyst (in embodiments in which homogeneous catalyst is provided) can be mixed with aromatic-rich stream 24, and the combined feed charged to organic peroxide generation apparatus 16.

In certain embodiments, shown in broken lines in FIG. 1, a mixer can be provided upstream of apparatus 16 in which gaseous oxidant, the aromatic-rich fraction, and homogeneous catalyst are admixed prior to passage into organic peroxide generation apparatus 16.

Oxidative reaction apparatus 18 generally includes an inlet for receiving stream 22b of feedstock 22 (in embodiments in which feed separation apparatus 12 is employed), aromatic-lean stream 26 and organic peroxide stream 32 from organic peroxide generation apparatus 16. In addition, oxidative reaction apparatus 18 includes an outlet for discharging a hydrocarbon stream 36 containing oxidized sulfur-containing and nitrogen-containing compounds. In certain embodiments, apparatus 18 contains an effective quantity of heterogeneous catalyst to promote oxidative desulfurization. In alternative embodiments (as indicated in FIG. 1 with dashed lines), or in combination with an effective quantity of heterogeneous catalyst, apparatus 18 includes an inlet for receiving an effective quantity of homogeneous catalyst 34.

In additional embodiments (not shown), homogeneous catalyst (in embodiments in which homogeneous catalyst is provided) can be mixed with aromatic-lean stream 26, or in embodiments in which feed separation apparatus 12 is included, partitioned stream 22b or the combined stream partitioned stream 22b and aromatic-lean stream 26. The catalyst-containing feed is then charged to oxidation reaction apparatus 18.

Oxidation product separation apparatus 20 contains an inlet for receiving oxidized hydrocarbon stream 36, an outlet for discharging a hydrocarbon product stream 38 and an outlet for discharging a stream 40 containing concentrated oxidation products of sulfur-containing and nitrogen-containing hydrocarbon compounds.

In operation of system 10, the hydrocarbon feed stream 22 to be treated can be divided into portions 22a, 22b, in which only partial stream 22a is subjected to the aromatic separation apparatus 16. In embodiments in which feed separation apparatus 12 is not deployed, the entire feed stream 22 is passed to the aromatic separation.

In embodiments in which feed separation apparatus 12 is a simple diverter, partial stream 22a is a slipstream of the initial feed 22.

In other embodiments in which feed separation apparatus 12 is a flash or distillation unit, partial stream 22a contains hydrocarbons having a boiling point at or above a certain temperature cut point, and partial stream 22b contains hydrocarbons having a boiling point below the temperature cut point. For instance, a substantial portion of the aromatic content in a feed suitable for use in the present process has a boiling point at or above about 300° C. to about 360° C., and in certain embodiments at or above about 340° C.

Feedstock 22 or partial stream 22a is fractioned into aromatic-rich stream 24 and aromatic-lean stream 26 in separation apparatus 14. Aromatic-rich stream 24 and gaseous oxidant stream 28, and optionally homogeneous catalyst 30, are introduced to organic peroxide generation apparatus 16. Gaseous oxidants suitable for peroxide generation include, but are not limited to oxides of nitrogen (e.g., nitrous oxide), oxygen, air, ozone, or combinations comprising any of these gaseous oxidants. The contents are maintained in organic peroxide generation apparatus 16 under suitable operating conditions and for a residence time sufficient to produce a desired quantity of organic peroxide.

Figure 2:
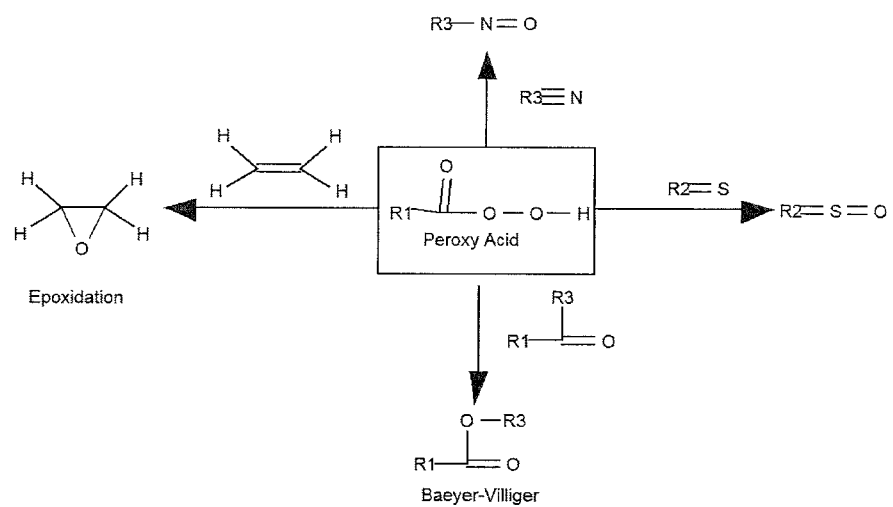
FIG. 2 illustrates a chemical reaction route for oxidation via peroxy compounds.

Peroxy acids are often used for the epoxidation of unsaturated compounds. The Baeyer-Villiger reaction of carbonyl compounds is notable, in which oxidation of nitrogen and sulfur compounds occurs as shown in FIG. 2.

According to the process herein, organic peroxides generated in organic peroxide generation apparatus 16 can be well-known compounds, most of which are otherwise available from commercial sources, but in those cases subject to transportation and handling costs.

The in-situ generated organic peroxides are of the general formula R'—OOR, wherein R represents an organic group containing one aromatic or multi-ring aromatics or naphtheno-aromatics substituted with one or several alkyl groups that have exposed tertiary hydrogen readily susceptible to oxidation, and wherein R' represents any of the compounds of R or hydrogen.

In particular, the reaction path for generation of organic peroxides is shown in the below equations (1)-(4), wherein M is the catalyst:

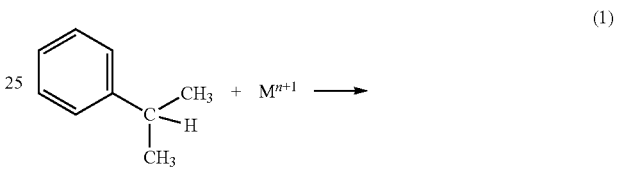

(1)

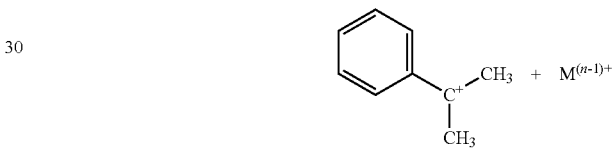

(2)

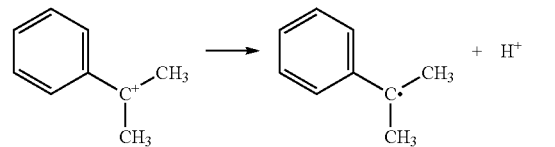

(3)

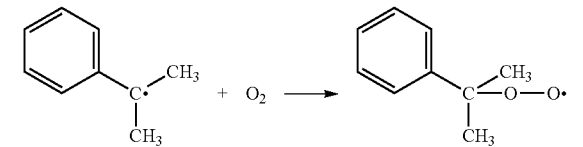

(4)

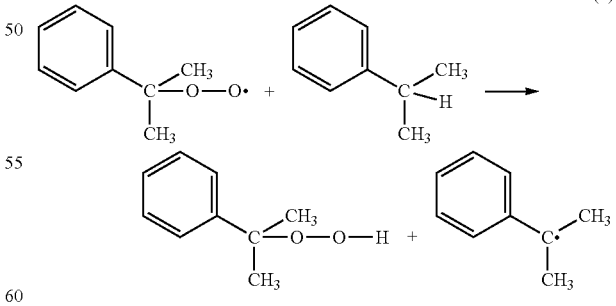

In the above equations (1)-(4), Equations (1)-(2) provide for generation of radicals. Equation (3) provides for peroxy radical formation. Equation (4) shows the chain reaction of the peroxide radical reacting with additional hydrocarbons to generate additional radicals. As discussed above, with respect to the general formula R'—OOR, R represents an organic group containing one aromatic or multi-ring aromatics or naphtheno-aromatics substituted with one or several alkyl groups that have exposed tertiary hydrogen readily susceptible to oxidation. In the case of equations (1)-(4), R' is hydrogen.

By separating the compounds that are easily oxidized to form peroxides, including aromatics and certain naphthenes, particularly those containing tertiary carbon, both in-situ generation of peroxides oxidative desulfurization can occur under relatively milder conditions.

It is noted that, although in certain existing oxidative desulfurization operations gaseous oxidant can be directly used to convert organo sulfur compounds to their oxidation products, the gaseous oxidant in these existing processes are generally less selective as compared to using organic peroxide as described herein, and also requires relatively more severe operating conditions.

Aromatic-lean stream 26 from aromatic separation apparatus 14, partial stream 22b (in embodiments in which feed separation apparatus 12 is employed), and stream 32 that is discharged from organic peroxide generation apparatus 16, which contains the newly formed organic peroxide compounds as well as unconverted aromatics compounds and naphthenic compounds from the feed to organic peroxide generation apparatus 16, are charged to oxidative reaction apparatus 18, optionally along with homogeneous catalyst via stream 34.

The contents are maintained in oxidative reaction apparatus 18 under suitable operating conditions and for a residence time sufficient to promote the desired oxidation reactions, i.e., oxidative conversion of sulfur-containing hydrocarbons to those containing sulfur and oxygen, such as sulfoxides or sulfones, and the nitrogen-containing hydrocarbons compounds to those containing nitrogen and oxygen.

In order to produce a hydrocarbon product having reduced levels of sulfur-containing and nitrogen-containing hydrocarbon compounds, stream 36, containing non-heteroatom hydrocarbons and oxidation products of sulfur-containing and nitrogen-containing hydrocarbon compounds, is conveyed from oxidative reaction apparatus 18 to oxidation product separation apparatus 20. This separation step can include, for instance, one or more of polishing, extraction, adsorption or decantation. A hydrocarbon product stream 38 having reduced levels of sulfur-containing and nitrogen-containing hydrocarbon compounds is discharged from the oxidation product separation apparatus 20. A stream 40 containing concentrated oxidation products of sulfur-containing and nitrogen-containing hydrocarbon compounds is also discharged, which can be subjected to further processing to recover hydrocarbons such as FCC, hydroprocessing, coker, visbreaker, or incorporated into a heavy gas oil pool.

Figure 3:
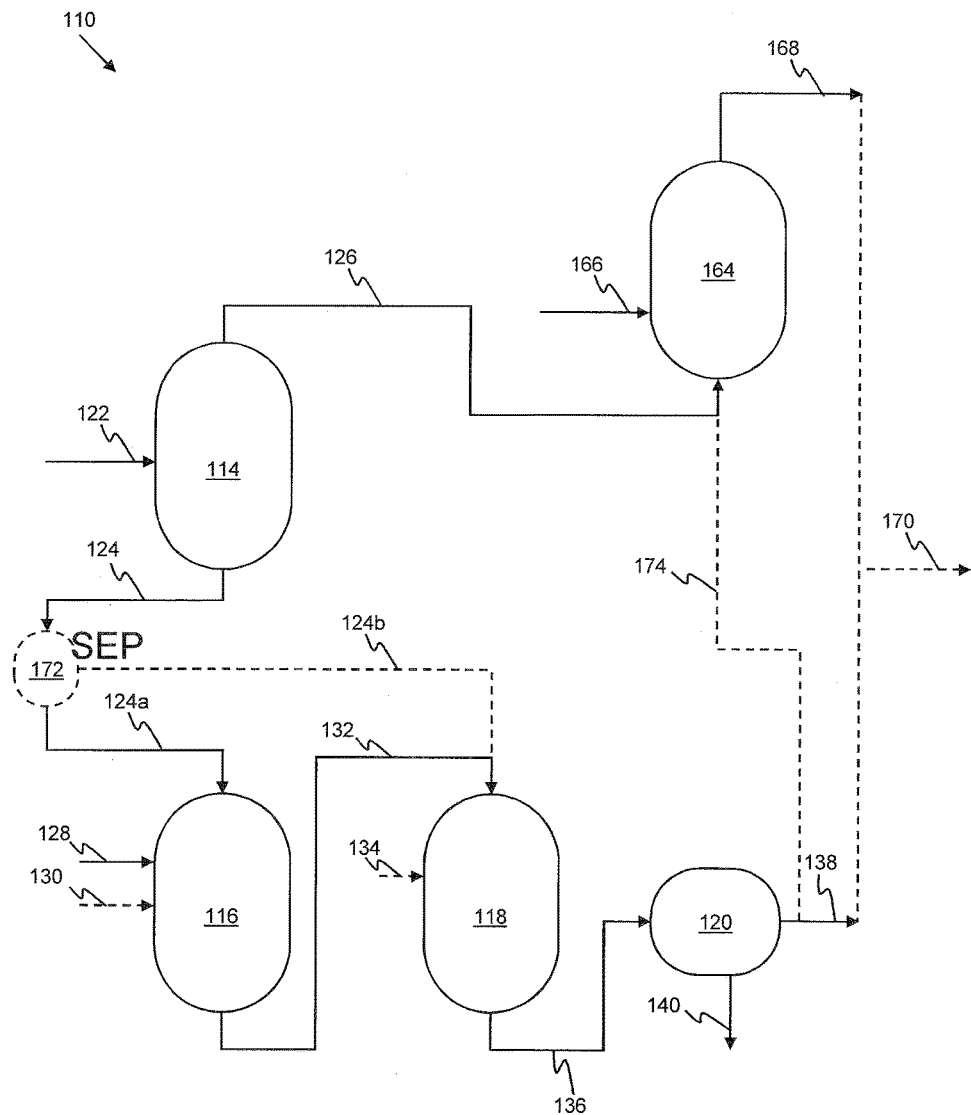
FIG. 3 is a process flow diagram of another embodiment of an integrated process for in-situ generation of organic peroxides and oxidation of an aromatic-rich portion, and hydrotreating of an aromatic-lean portion.
Figure 4:
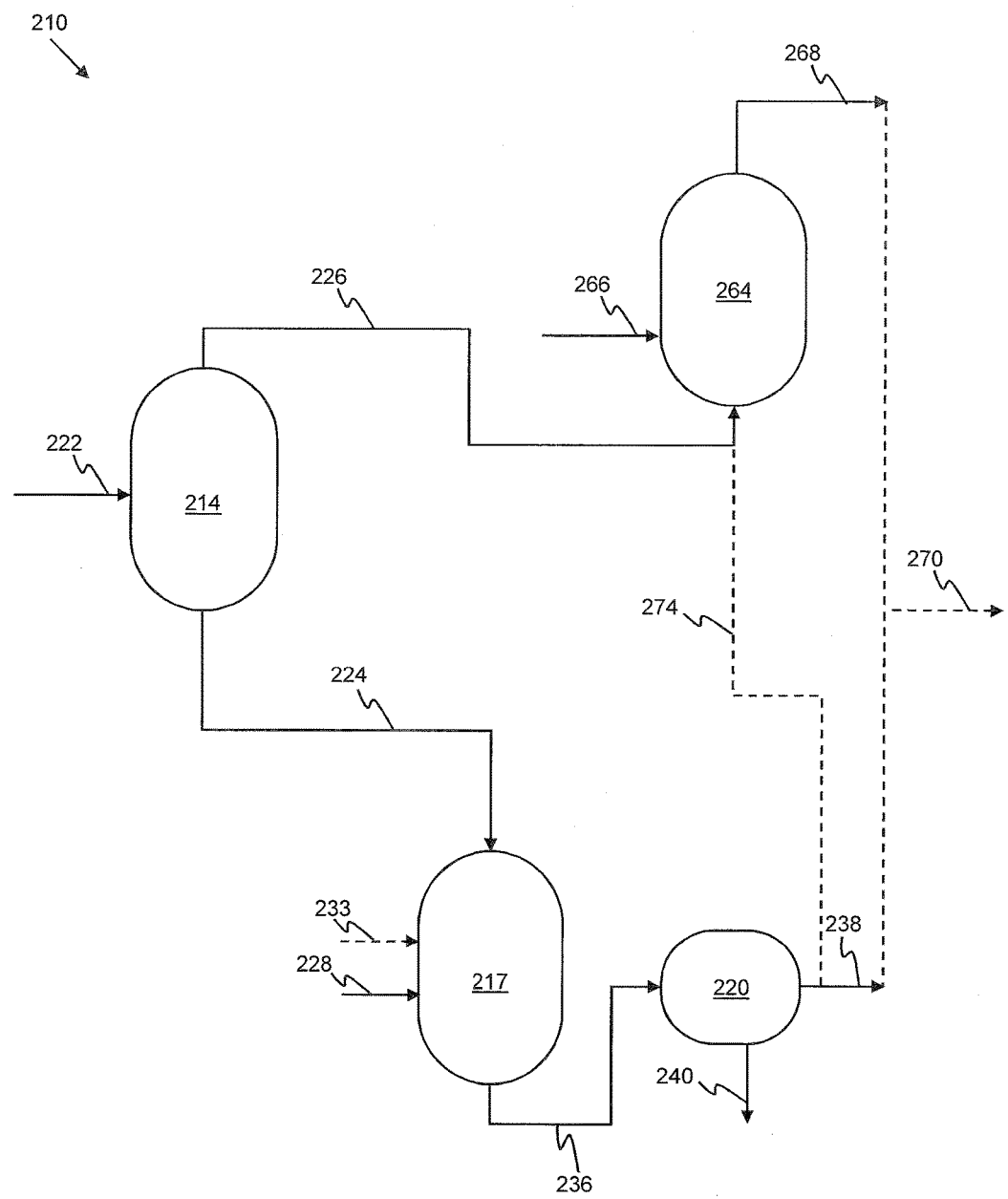
FIG. 4 is a process flow diagram of a further embodiment of an integrated process for in-situ generation of organic peroxides and oxidation of an aromatic-rich portion, and hydrotreating of an aromatic-lean portion, in which generation of organic peroxides and oxidation occur in a common apparatus or vessel.

FIGS. 3 and 4 show additional embodiments in which a hydrotreating unit is integrated to treat the aromatic-lean fraction. While the description refers to the entire aromatic-lean fraction, it is to be appreciated that a portion of the aromatic-lean fraction can be subjected to oxidative desulfurization reactions, e.g., as shown and described with respect to FIG. 1.

Referring now to FIG. 3, a system 110 is depicted including an arrangement of unit operations suitable for another embodiment of a process incorporating in-situ generation of organic peroxide oxidants is provided. The arrangement and operation of an organic peroxide generation apparatus 116, an oxidative reaction apparatus 118 and an oxidation products separation apparatus 120 are similar to that of organic peroxide reaction apparatus 16, oxidative reaction apparatus 18 and oxidation products separation apparatus 20 as discussed above with reference to FIG. 1. In system 110, an aromatic separation apparatus 114 is provided which separates aromatic contents from an initial feedstream 122 into an aromatic-rich stream 124 and an aromatic-lean stream 126. Aromatic-rich stream 124 can be separated into a partial stream 124a and 124b in an aromatic-rich stream separation apparatus 172 prior to being passed to the organic peroxide generation apparatus 116. Aromatic-rich stream separation apparatus 172, an optional unit operation as denoted by dashed lines in FIG. 3, can be any suitable apparatus to partition aromatic-rich stream 124. Similar to the initial feed separation apparatus 12 described with respect to FIG. 1, apparatus 172 can be a simple diverter to provide a slipstream of aromatic-rich stream 124, a flash separation apparatus to fraction aromatic-rich stream 124 based on a temperature cup point, or a distillation unit.

A generated organic peroxide selective oxidant stream 132 is conveyed to oxidative reaction apparatus 118, optionally along with partial stream 124b in embodiments in which aromatic-rich stream separation apparatus 172 is employed, and optionally with homogeneous catalyst via stream 134 either as the sole source of catalyst or in combination with heterogeneous catalyst contained in oxidative reaction apparatus 118.

The contents are maintained in oxidative reaction apparatus 118 under suitable operating conditions and for a residence time sufficient to promote the desired oxidation reactions. A stream 136, containing non-heteroatom hydrocarbons and oxidation products of sulfur-containing and nitrogen-containing hydrocarbon compounds, is conveyed from oxidative reaction apparatus 118 to oxidation products separation apparatus 120, from which an aromatic-rich hydrocarbon product stream 138 having reduced levels of sulfur-containing and nitrogen-containing hydrocarbon compounds is discharged along with a stream 140 containing concentrated oxidation products of sulfur-containing and nitrogen-containing hydrocarbon compounds.

The aromatic-lean stream 126 from the aromatic separation apparatus 114 is conveyed, along with hydrogen via a stream 166, to a hydrotreating apparatus 164. In certain embodiments, all or a portion of the hydrocarbon product stream 138 from the oxidation products separation apparatus 120, stream 174, can also be conveyed to the hydrotreating apparatus 164 for further desulfurization and/or denitrification.

Desulfurized and/or denitrified products from hydrotreating apparatus 164 can be discharged separately as an aromatic-lean hydrotreated product via a stream 168, or optionally combined with the hydrocarbon product stream 138 as a stream 170. The product stream(s) can be passed to further refining operations or used/delivered as end product.

Referring now to FIG. 4, a system 210 is depicted including an arrangement of unit operations suitable for another embodiment of a process incorporating in-situ generation of organic peroxide oxidants is provided. The arrangement and operation of unit operations in system 210 are similar to that of system 110 as discussed above with reference to FIG. 3, with a modification whereby organic peroxide generation and oxidative reactions occur in a common reactor 217. In this embodiment, an optional homogeneous catalyst stream 233 can be conveyed to reactor 217 either as the sole source of catalyst or in combination with heterogeneous catalyst contained in reactor 217. Either or both of the homogeneous catalyst stream 233 or a heterogeneous catalyst contained in reactor 217 can be a bi-functional catalyst suitable for promoting organic peroxide generation from an aromatic-rich stream 224 and for promoting oxidative reaction of the heteroatom-containing hydrocarbon compounds, e.g., desulfurization.

Note that while the dual function vessel is shown in a configuration with the mild hydrotreatment zone, it is intended that this dual function vessel can be utilized in a system similar to that shown with respect to FIG. 1, i.e., in which removal of heteroatoms occurs entirely by oxidative reactions.

The hydrocarbon feed stream to be treated according to the process herein is generally a liquid hydrocarbon stream, such as straight run fuel oil or diesel, which includes sulfur-containing and nitrogen-containing hydrocarbon compounds. Hydrocarbon feedstocks suitable for reduction of heteroatom-containing compounds by the system and process of the present invention can include hydrocarbon fractions boiling in the range of about 36° C. to about 520° C., preferably about 36° C. to about 370° C. The sulfur-containing compounds that can advantageously be removed include mercaptans, thiophenic compounds, benzothiophenic compounds and dibenzothiophenic compounds, which can include substituted alkyl, aryl or alkaryl groups. The nitrogen-containing compounds that can advantageously be removed include pyridines, amines, pyrroles, anilines, quinolines, and acridines, which can include substituted alkyl, aryl or alkaryl groups. In particular, feedstocks containing one or more benzothiophenic compounds, dibenzothiophenic compounds, pyrroles, quinolines or acridines can benefit from the process described herein, as these compounds are typically not removable by hydrotreating under relatively mild conditions.

In embodiments in which a feed or aromatic rich separation apparatus 12, 172 is provided and is a simple diverter, stream 22a, 124a can include about 1 V % to about 90 V % of the influent stream 22, 124, in certain embodiments about 1 V % to about 50 V %, and in further embodiments about 1 V % to about 30 V %. In embodiments in which feed separation apparatus 12, 172 is provided and is a flash or distillation apparatus, a stream 22a, 124a, with an initial boiling point in the range of about 300° C. to about 360° C. and in certain embodiments in the range of about 300° C. to about 360° C., can include about 1 V % to about 50 V % of the influent stream 22, 124 in certain embodiments about 1 V % to about 30 V %, and in further embodiments about 1 V % to about 5 V %

The proportions of the aromatic-rich fraction and the aromatic-lean fraction are primarily dependant on the type of aromatic separation apparatus employed. In addition, in embodiments of system 10, these proportions also can depend on whether feed separation apparatus 12 is a diverter or based on a flash or distillation separation. Due to nature of aromatic separation processes such as solvent extraction, the extracted aromatics fraction will contain non-aromatic compounds, including naphtenes and paraffins.

Since aromatic extraction operations typically do not provide sharp cut-offs between the aromatics and non-aromatics, the aromatic-lean fraction contains a major proportion of the non-aromatic content of the initial feed and a minor proportion of the aromatic content of the initial feed, and the aromatic-rich fraction contains a major proportion of the aromatic content of the initial feed and a minor proportion of the non-aromatic content of the initial feed. The amount of non-aromatics in the aromatic-rich fraction, and the amount of aromatics in the aromatic-lean fraction, depend on various factors as will be apparent to one of ordinary skill in the art, including the type of extraction and the number of theoretical plates in the extractor, the type of solvent and the solvent ratio.

The aromatic compounds that pass to the aromatic-rich fraction include aromatic organosulfur compounds, such as benzothiophene, dibenzothiophene, benzonaphtenothiophene, and derivatives of benzothiophene, dibenzothiophene and benzonaphtenothiophene. Various non-aromatic organosulfur compounds that may have been present in the initial feed, i.e., prior to hydrotreating, include mercaptans, sulfides and disulfides.

In addition, certain organonitrogen compounds having aromatic moieties also pass with the aromatic-rich fraction. Further, certain organic nitrogen compounds, paraffinic or naphthenic nature, may have polarities causing them to be extracted and remain in aromatic-rich fraction.

As used herein, the term "aromatic-lean" means at least greater than 50 wt % of the non-aromatic content of the feed to the aromatic separation apparatus, preferably at least greater than about 85 wt %, and most preferably greater than at least about 95 wt %. Also as used herein, the term "aromatic-rich" means at least greater than 50 wt % of the aromatic content of the feed to the aromatic separation apparatus, preferably at least greater than about 85 wt %, and most preferably greater than at least about 95 wt %.

In embodiments of the present invention, the organic peroxide generation apparatus includes one or more types of continuous flow or batch reactors including but not limited to a continuous stirred-tank reactors, fixed-bed, continuous stirred fixed bed reactors, ebullated-bed, slurry bed, moving bed, or bubble column.

Figure 12A:
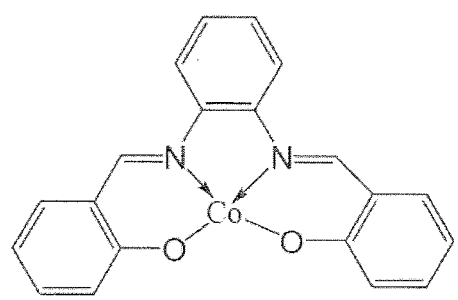
FIG. 12A is the chemical structure of a Co(Salophen) used as a catalyst for organic peroxide generation in the example herewith.

Suitable catalysts employed in the organic peroxide generation apparatus include but are not limited to those having the general formula $M_xO_y$, where x=1 or 2, and y=2 or 5, and where M is an element that is selected from the group consisting of the elements of groups IVB, VB and VIB of the Periodic Table or/an a mixture of thereof. Examples of suitable peroxide generation catalyst active components include, but are not limited to, complex metals of Ni, Ti, Zr, Cr, Mo and or W in the range of 5 ppm to 1 wt. %. Examples of particular peroxide generation catalyst compounds include, but are not limited to, $MoO_2$, $Fe_2O_3$, $V_2O_5$, $ZrO_2$, and $TiO_2$. In additional embodiments, suitable catalysts employed in the organic peroxide generation apparatus include Co(Salophen) or its complexes, and example of which is shown in FIG. 12A.

In additional embodiments, as noted above, homogeneous catalysts can be used in place of, or in conjunction with, heterogeneous catalysts in the organic peroxide generation apparatus. Suitable homogeneous catalysts for peroxide oxidant generation include transition metal complexes.

In the organic peroxide generation apparatus, the aromatic-rich feed is maintained in contact with the gaseous oxidant and catalyst for a sufficient period of time to complete organic peroxides generation, generally about 5 minutes to about 180 minutes, in certain embodiments about 15 minutes to about 90 minutes and in further embodiments at about 30 minutes to about 60 minutes.

The reaction conditions of the organic peroxide generation apparatus include an operating pressure of about 1 bar to about 30 bars, in certain embodiments about 1 bar to about 10 bars and in further embodiments at about 1 bar to about 3 bars; and an operating temperature of about 20° C. to about 300° C., in certain embodiments about 20° C. to about 150° C. and in further embodiments about 45° C. to about 60° C.

The molar feed ratio of gaseous oxidant to aromatic carbon is generally about 1:1 to about 100:1, in certain embodiments about 1:1 to about 30:1, and in further embodiments about 1:1 to about 4:1.

The quantity of organic peroxide produced in the organic peroxide generation apparatus can be about 0.1 V % to about 30 V % in certain embodiments about 0.1 V % to about 10 V % and in further embodiments about 0.1 V % to about 5 V %.

In embodiments of the present invention, oxidative reaction apparatus includes one or more types of continuous flow or batch reactors including but not limited to continuous stirred-tank reactors, fixed-bed, continuous stirred fixed bed reactors, ebullated-bed, slurry bed, moving bed, or bubble column.

Suitable catalysts can also be employed in the oxidative reaction apparatus, including but not limited to alkali transition metal oxides. For instance, the oxidation catalyst can be selected from one or more homogeneous or heterogeneous catalysts having metals from Group VB to Group VIIIB of the Periodic Table, including those selected from Mn, Co, Fe, Cr Ni, Ti, Zr, W, V and Mo. Examples of suitable oxidation catalyst compounds include molybdenum hexacarbonyl, molybdenum acetylacetone, $MoO_2$, $Fe_2O_3$, $V_2O_5$, $ZrO_2$, $TiO_2$. In additional embodiments, the oxidative reaction catalyst includes salts of transition metal oxides, wherein salts are selected from Group IA and IIA of the Periodic Table such as $Na^+$, $K^+$, $Ca^{2+}$, $Mg^{2+}$, or mixtures thereof, including but not limited to sodium tungstate.

In addition, one or more phase transfer agents, such as formic or acetic acid can be included with the oxidative reaction mixture.

The oxidative reactions can be carried out in the oxidative reaction apparatus at an operating pressure of about 1 bar to about 30 bars, in certain embodiments about 1 bar to about 10 bars and in further embodiments at about 1 bar to about 3 bars; and an operating temperature of about 20° C. to about 300° C., in certain embodiments about 20° C. to about 150° C. and in further embodiments about 45° C. to about 60° C. The molar feed ratio of oxidizing agent to sulfur is generally about 1:1 to about 100:1, in certain embodiments about 1:1 to about 30:1, and in further embodiments about 1:1 to about 4:1, residence time about 5 to about 180 minutes, in certain embodiments about 15 to about 90 minutes and in further embodiments about 15 minutes to about 30 minutes.

In embodiments of the present invention, oxidation product separation apparatus 20 includes one or more unit operations including but not limited to decanting vessels, distillation units, adsorption units, or solvent extraction units. The details and specific arrangement of oxidation product separation apparatus 20 are beyond the scope of the present description.

In certain embodiments, for instance as described with respect to FIG. 4, bi-functional catalyst compounds are provided, containing one or more metal active species to catalytically promote peroxide generation and one or more metal active species to promote oxidation of heteroatom-containing hydrocarbon compounds reactions. Suitable bi-functional homogeneous catalyst compounds that can be used instead of, or in conjunction with, heterogeneous catalyst include, but are not limited to those derived from combinations of metal naphthenate or metal acetate of metals from groups IIB to IVB such as Cu(acac)2-VO(acac)2; or Cu(acac)2-Co(acac)2.

In a combined reaction apparatus for organic peroxide generation and oxidative reaction, the aromatic-rich feed is maintained in contact with the gaseous oxidant and catalyst for a sufficient period of time to complete organic peroxides generation and oxidative reaction, generally about 5 to about 180 minutes, in certain embodiments about 15 to about 90 minutes and in further embodiments about 15 minutes to about 30 minutes.

The reaction conditions of the organic peroxide generation apparatus include an operating temperature of about 25° C. to about 300° C., in certain embodiments about 25° C. to about 250° C. and in further embodiments about 25° C. to about 200° C. The reaction conditions of the organic peroxide generation apparatus include an operating pressure of about 1 bars to about 50 bars, in certain embodiments about 1 bar to about 40 bars and in further embodiments at about 1 bar to about 30 bars;

Suitable apparatus for a dual function reactor include one or more types of continuous flow or batch reactors including but not limited to a continuous stirred-tank reactors, fixed-bed, continuous stirred fixed bed reactors, ebullated-bed, slurry bed, moving bed, or bubble column.

Figure 5:
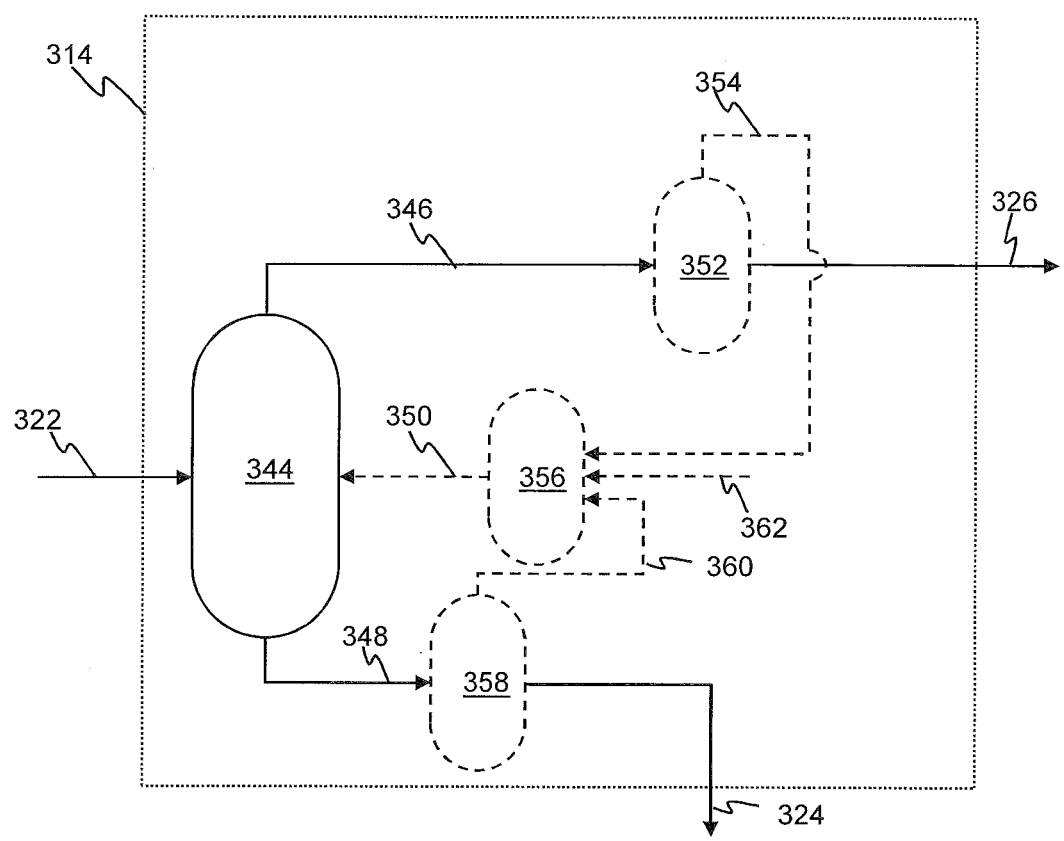
FIG. 5 is a process flow diagram of solvent handling for an aromatic separation apparatus.

The aromatic separation apparatus used herein can be a suitable solvent extraction aromatic separation apparatus capable of partitioning the feed thereto into aromatic-lean stream and aromatic-rich stream. As shown in FIG. 5, an aromatic separation apparatus 314 can include suitable unit operations to perform a solvent extraction of aromatics, and recover solvents for reuse in the process. A feed 322 is conveyed to an aromatic extraction vessel 344 in which a first, aromatic-lean, fraction is separated as a raffinate stream 346 from a second, generally aromatic-rich, fraction as an extract stream 348. A solvent feed 350 is introduced into the aromatic extraction vessel 344.

In operations in which the solvent existing in stream 346 exceeds a desired or predetermined amount, solvent can be removed from the hydrocarbon product, for example, using a flashing or stripping unit 352, or other suitable apparatus. Solvent 354 from the flashing unit 352 can be recycled to the aromatic extraction vessel 344, e.g., via a surge drum 356. Initial solvent feed or make-up solvent can be introduced via stream 362. An aromatic-lean stream 326 is discharged from the flashing unit 352 and conveyed to the oxidative reaction apparatus 318 as described above.

In addition, where solvent existing in stream 348 exceeds a desired or predetermined amount, solvent can be removed from the hydrocarbon product, for example, using a flashing or stripping unit 358 or other suitable apparatus. Solvent 60 from the flashing unit 354 can be recycled to the aromatic extraction vessel 344, e.g., via the surge drum 356. An aromatic-rich stream 324 is discharged from the flashing unit 358.

Selection of solvent, operating conditions, and the mechanism of contacting the solvent and feed permit control over the level of aromatic extraction. For instance, suitable solvents include furfural, N-methyl-2-pyrrolidone, dimethylformamide or dimethylsulfoxide, and can be provided in a solvent to oil ratio of about 20:1, in certain embodiments about 4:1, and in further embodiments about 1:1. The aromatic separation apparatus can operate at a temperature in the range of about 20° C. to about 120° C., and in certain embodiments in the range of about 40° C. to about 80° C. The operating pressure of the aromatic separation apparatus can be in the range of about 1 bar to about 10 bars, and in certain embodiments, in the range of about 1 bar to 3 bars. Types of apparatus useful as the aromatic separation apparatus of the present invention include stage-type extractors or differential extractors.

Figure 6:
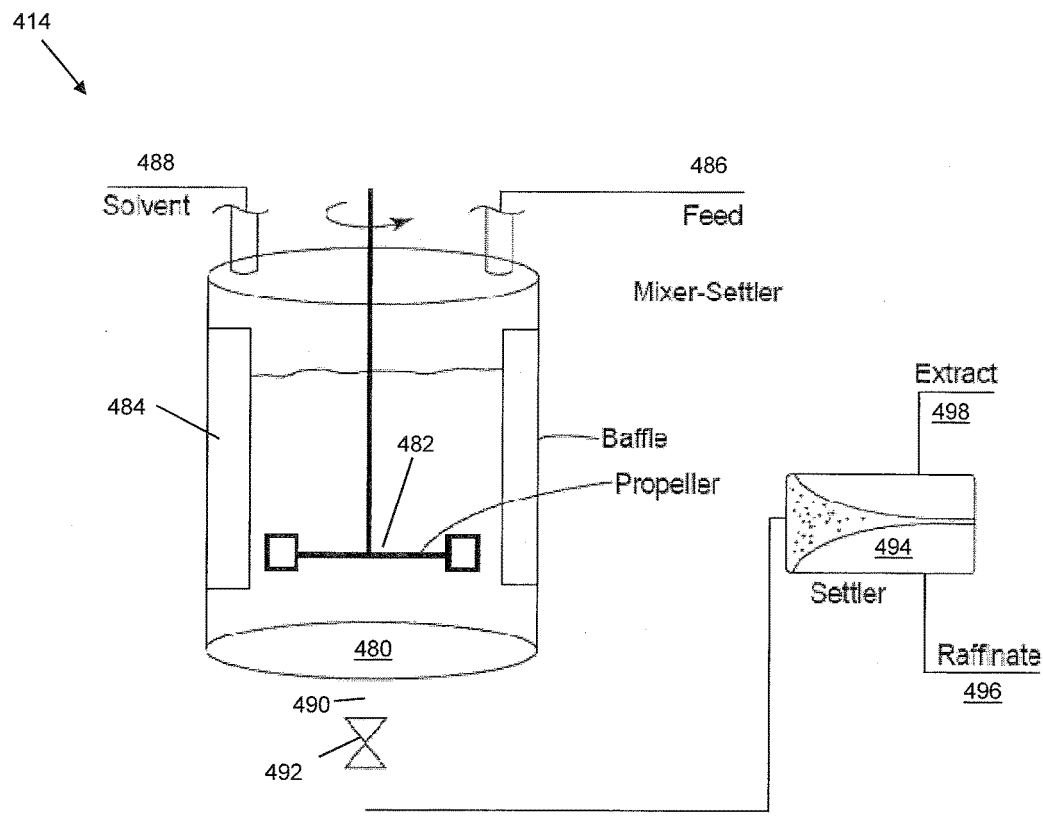
FIGS. 6-11 show various examples of apparatus suitable for use as the aromatic separation apparatus.

An example of a stage-type extractor is a mixer-settler apparatus 414 schematically illustrated in FIG. 6. Mixer-settler apparatus 414 includes a vertical tank 480 incorporating a turbine or a propeller agitator 482 and one or more baffles 484. Charging inlets 486, 488 are located at the top of tank 480 and outlet 490 is located at the bottom of tank 480. The feedstock to be extracted is charged into vessel 480 via inlet 486 and a suitable quantity of solvent is added via inlet 488. The agitator 482 is activated for a period of time sufficient to cause intimate mixing of the solvent and charge stock, and at the conclusion of a mixing cycle, agitation is halted and, by control of a valve 492, at least a portion of the contents are discharged and passed to a settler 494. The phases separate in the settler 494 and a raffinate phase containing an aromatic-lean hydrocarbon mixture and an extract phase containing an aromatic-rich mixture are withdrawn via outlets 496 and 498, respectively. In general, a mixer-settler apparatus can be used in batch mode, or a plurality of mixer-settler apparatus can be staged to operate in a continuous mode.

Another stage-type extractor is a centrifugal contactor. Centrifugal contactors are high-speed, rotary machines characterized by relatively low residence time. The number of stages in a centrifugal device is usually one, however, centrifugal contactors with multiple stages can also be used. Centrifugal contactors utilize mechanical devices to agitate the mixture to increase the interfacial area and decrease the mass transfer resistance.

Various types of differential extractors (also known as "continuous contact extractors,") that are also suitable for use as an aromatic extraction apparatus in zone 22 of the present invention include, but are not limited to, centrifugal contactors and contacting columns such as tray columns, spray columns, packed towers, rotating disc contactors and pulse columns.

Contacting columns are suitable for various liquid-liquid extraction operations. Packing, trays, spray or other droplet-formation mechanisms or other apparatus are used to increase the surface area in which the two liquid phases (i.e., a solvent phase and a hydrocarbon phase) contact, which also increases the effective length of the flow path. In column extractors, the phase with the lower viscosity is typically selected as the continuous phase, which, in the case of an aromatic extraction apparatus, is the solvent phase. In certain embodiments, the phase with the higher flow rate can be dispersed to create more interfacial area and turbulence. This is accomplished by selecting an appropriate material of construction with the desired wetting characteristics. In general, aqueous phases wet metal surfaces and organic phases wet non-metallic surfaces. Changes in flows and physical properties along the length of an extractor can also be considered in selecting the type of extractor and/or the specific configuration, materials or construction, and packing material type and characteristics (i.e., average particle size, shape, density, surface area, and the like).

Figure 7:
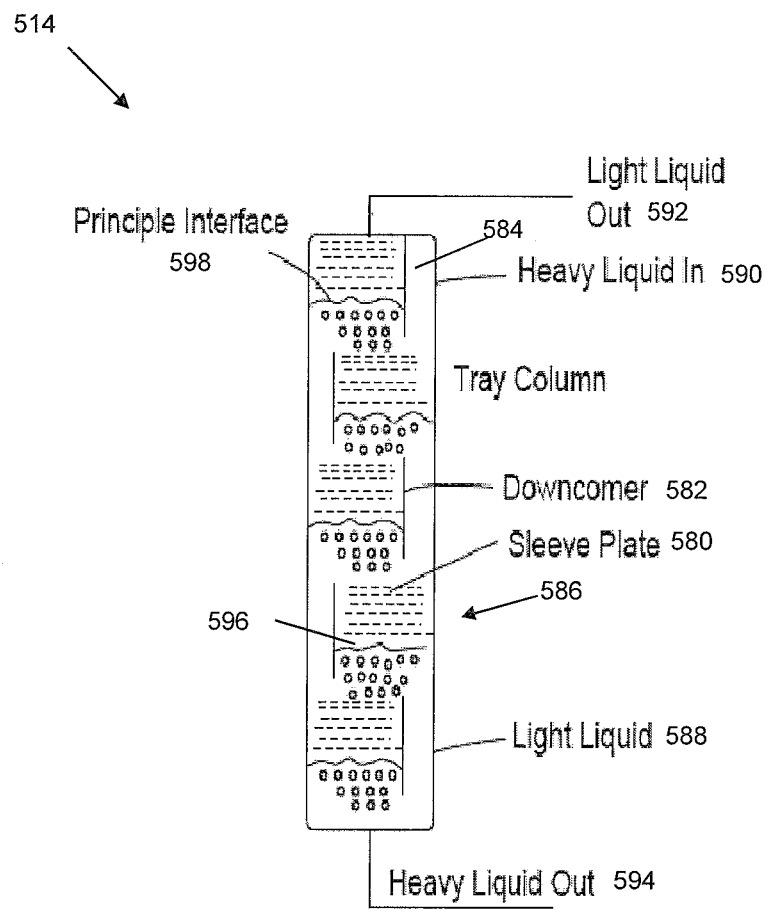

A tray column 514 is schematically illustrated in FIG. 7. A light liquid inlet 588 at the bottom of column 514 receives liquid hydrocarbon, and a heavy liquid inlet 590 at the top of column 514 receives liquid solvent. Column 514 includes a plurality of trays 580 and associated downcomers 582. A top level baffle 584 physically separates incoming solvent from the liquid hydrocarbon that has been subjected to prior extraction stages in the column 514. Tray column 514 is a multi-stage counter-current contactor. Axial mixing of the continuous solvent phase occurs at region 586 between trays 580, and dispersion occurs at each tray 580 resulting in effective mass transfer of solute into the solvent phase. Trays 580 can be sieve plates having perforations ranging from about 1.5 to 4.5 mm in diameter and can be spaced apart by about 150-600 mm.

Light hydrocarbon liquid passes through the perforation in each tray 580 and emerges in the form of fine droplets. The fine hydrocarbon droplets rise through the continuous solvent phase and coalesce into an interface layer 596 and are again dispersed through the tray 580 above. Solvent passes across each plate and flows downward from tray 580 above to the tray 580 below via downcomer 582. The principle interface 598 is maintained at the top of column 514. Aromatic-lean hydrocarbon liquid is removed from outlet 592 at the top of column 514 and aromatic-rich solvent liquid is discharged through outlet 594 at the bottom of column 514. Tray columns are efficient solvent transfer apparatus and have desirable liquid handling capacity and extraction efficiency, particularly for systems of low-interfacial tension.

Figure 8:
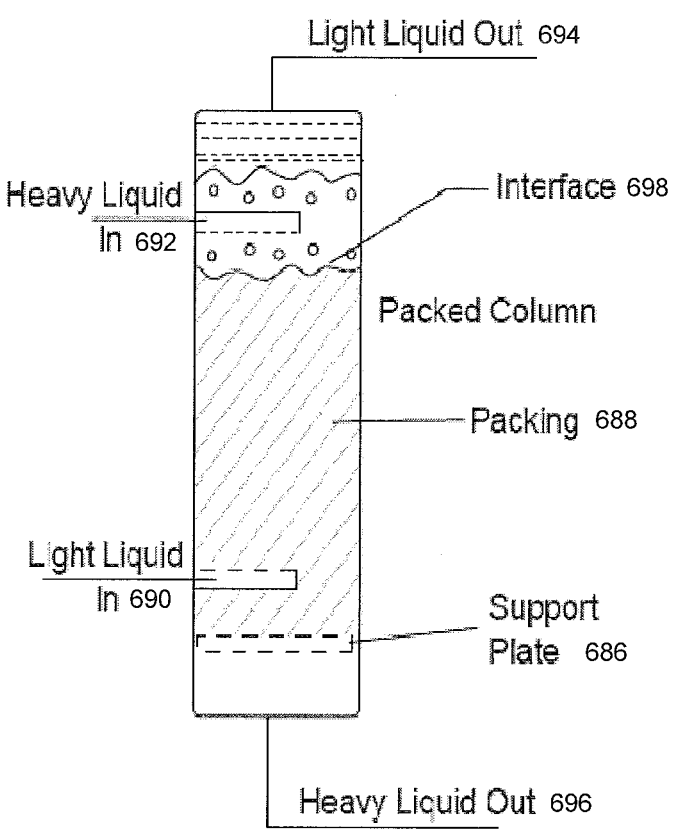

An additional type of unit operation suitable for extracting aromatics from the hydrocarbon feed is a packed bed column. FIG. 8 is a schematic illustration of a packed bed column 614 having a hydrocarbon inlet 690 and a solvent inlet 692. A packing region 688 is provided upon a support plate 686. Packing region 688 comprises suitable packing material including, but not limited to, Pall rings, Raschig rings, Kascade rings, Intalox saddles, Berl saddles, super Intalox saddles, super Berl saddles, Demister pads, mist eliminators, telerrettes, carbon graphite random packing, other types of saddles, and the like, including combinations of one or more of these packing materials. The packing material is selected so that it is fully wetted by the continuous solvent phase. The solvent introduced via inlet 692 at a level above the top of the packing region 688 flows downward and wets the packing material and fills a large portion of void space in the packing region 688. Remaining void space is filled with droplets of the hydrocarbon liquid which rise through the continuous solvent phase and coalesce to form the liquid-liquid interface 698 at the top of the packed bed column 614. Aromatic-lean hydrocarbon liquid is removed from outlet 694 at the top of column 614 and aromatic-rich solvent liquid is discharged through outlet 696 at the bottom of column 614. Packing material provides large interfacial areas for phase contacting, causing the droplets to coalesce and reform. The mass transfer rate in packed towers can be relatively high because the packing material lowers the recirculation of the continuous phase.

Figure 9:
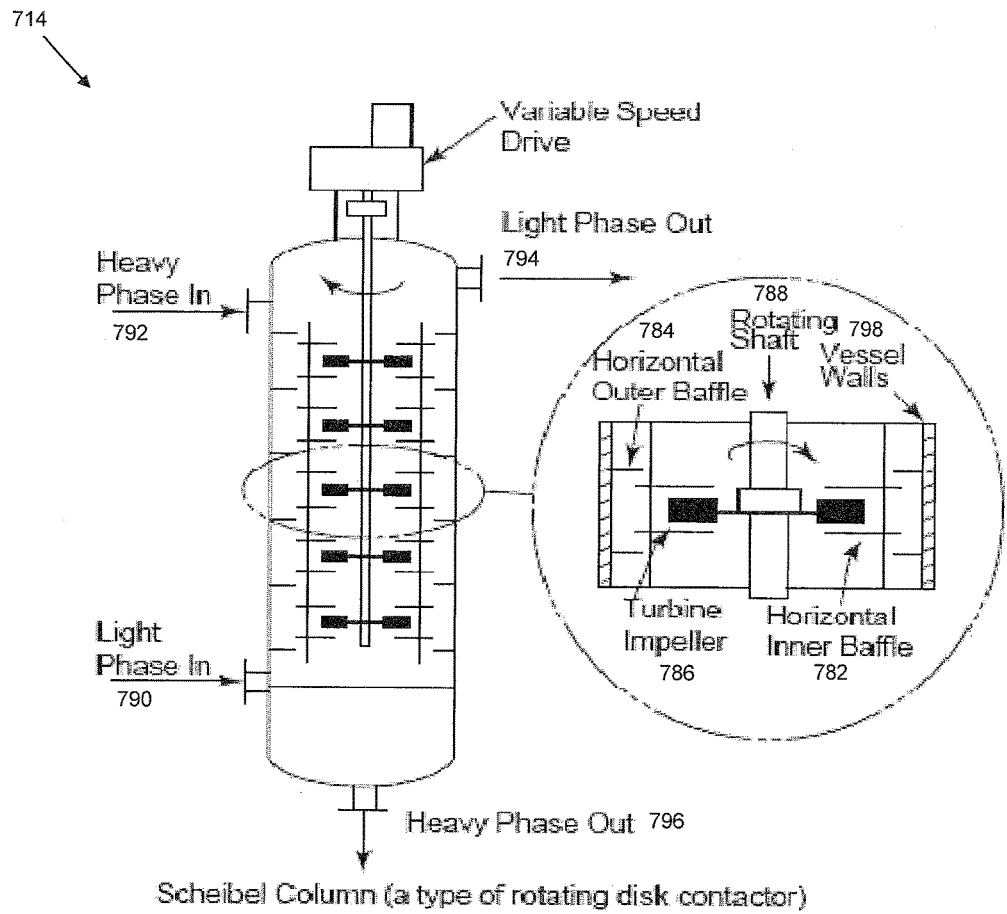

Further types of apparatus suitable for aromatic extraction in the system and method of the present invention include rotating disc contactors. FIG. 9 is a schematic illustration of a rotating disc contactor 714 known as a Scheiebel® column commercially available from Koch Modular Process Systems, LLC of Paramus, N.J., USA. It will be appreciated by those of ordinary skill in the art that other types of rotating disc contactors can be implemented as an aromatic extraction unit included in the system and method of the present invention, including but not limited to Oldshue-Rushton columns, and Kuhni extractors. The rotating disc contactor is a mechanically agitated, counter-current extractor. Agitation is provided by a rotating disc mechanism, which typically runs at much higher speeds than a turbine type impeller as described with respect to FIG. 6.

Rotating disc contactor 714 includes a hydrocarbon inlet 790 toward the bottom of the column and a solvent inlet 792 proximate the top of the column, and is divided into number of compartments formed by a series of inner stator rings 782 and outer stator rings 784. Each compartment contains a centrally located, horizontal rotor disc 786 connected to a rotating shaft 788 that creates a high degree of turbulence inside the column. The diameter of the rotor disc 786 is slightly less than the opening in the inner stator rings 782.

Typically, the disc diameter is 33-66% of the column diameter. The disc disperses the liquid and forces it outward toward the vessel wall 798 where the outer stator rings 784 create quiet zones where the two phases can separate. Aromatic-lean hydrocarbon liquid is removed from outlet 794 at the top of column 714 and aromatic-rich solvent liquid is discharged through outlet 796 at the bottom of column 714. Rotating disc contactors advantageously provide relatively high efficiency and capacity and have relatively low operating costs.

Figures 10, 11:
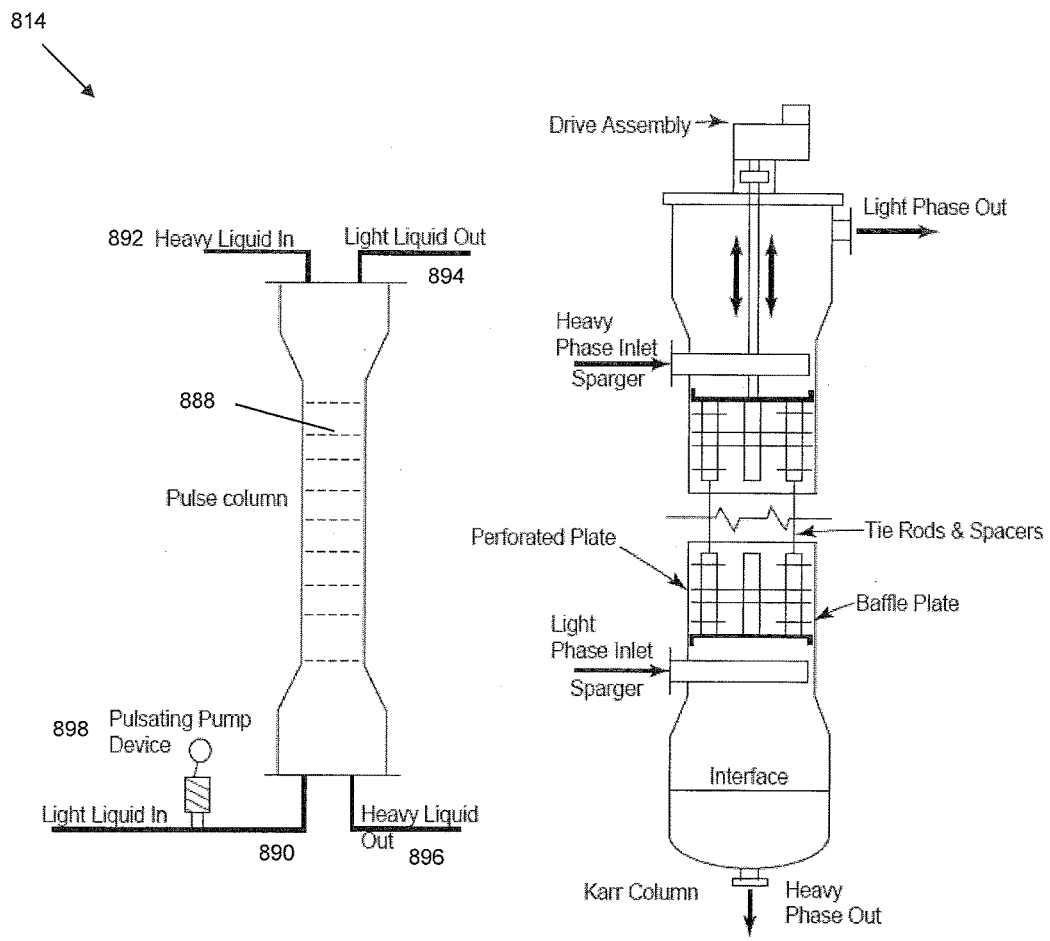

An additional type of apparatus suitable for aromatic extraction in the system and method of the present invention is a pulse column. FIG. 10 is a schematic illustration of a pulse column system 814, which includes a column with a plurality of packing or sieve plates 888, a light phase, i.e., solvent, inlet 890, a heavy phase, i.e., hydrocarbon feed, inlet 892, a light phase outlet 894 and a heavy phase outlet 896.

In general, pulse column system 814 is a vertical column with a large number of sieve plates 888 lacking down corners. The perforations in the sieve plates 888 typically are smaller than those of non-pulsating columns, e.g., about 1.5 mm to about 3.0 mm in diameter.

A pulse-producing device 898, such as a reciprocating pump, pulses the contents of the column at frequent intervals. The rapid reciprocating motion, of relatively small amplitude, is superimposed on the usual flow of the liquid phases. Bellows or diaphragms formed of coated steel (e.g., coated with polytetrafluoroethylene), or any other reciprocating, pulsating mechanism can be used. A pulse amplitude of 5-25 mm is generally recommended with a frequency of 100-260 cycles per minute. The pulsation causes the light liquid (solvent) to be dispersed into the heavy phase (oil) on the upward stroke and heavy liquid phase to jet into the light phase on the downward stroke. The column has no moving parts, low axial mixing, and high extraction efficiency.

A pulse column typically requires less than a third the number of theoretical stages as compared to a non-pulsating column. A specific type of reciprocating mechanism is used in a Karr Column which is shown in FIG. 11.

Advantageously, the process and system described herein minimize oxidant cost, and in particular minimize the safety requirements associated with handling liquid peroxide compounds. In contrast to existing oxidation processes based on hydrogen peroxide, the process and system described herein employs in-situ production of organic peroxides from the feed itself as a source of effective oxygen to further oxidize sulfur containing compounds into sulfoxides/sulfones.

In addition, in conventional oxidation processes using an external source of hydrogen peroxide, it is usually provided as a 30% $H_2O_2$ aqueous solution with stabilizers. The diluted hydrogen peroxide and stabilizers have a detrimental impact on the capability of oxidizing sulfur compounds.

Furthermore, production of organic peroxides in-situ allows for a single liquid phase oxidative desulfurization process, rather than a biphasic (liquid-liquid) system as with aqueous peroxides.

Still further, only gas required for the present process is the gaseous oxidant, providing a significant advantage over hydrotreating processes which require considerable quantities of gaseous hydrogen.

EXAMPLES

Example 1

Figure 12B:
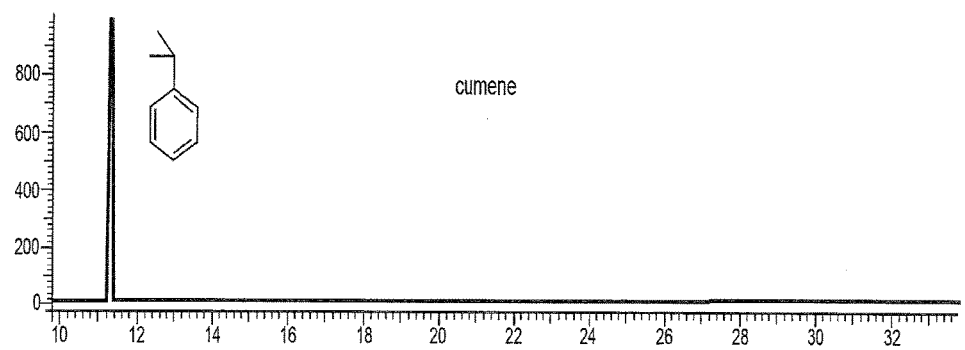
FIG. 12B is a gas chromatography chart depicting cumene peroxide formation in the example herewith.
Figure 12B:
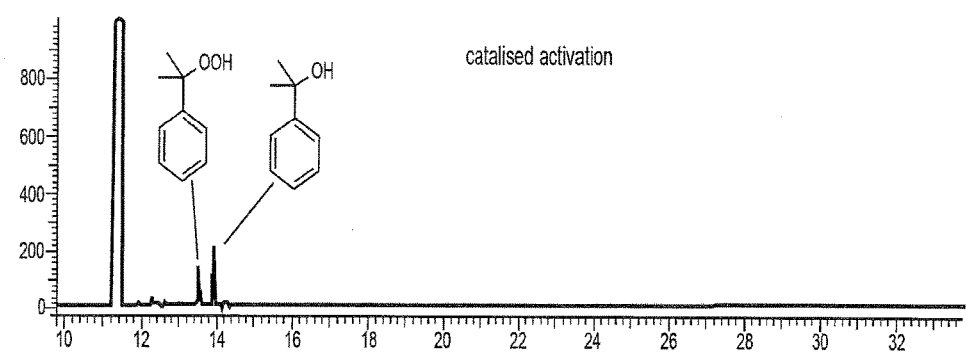

Cumene peroxide was generated in-situ using Co(Salophen) (structure shown in FIG. 12A) as a catalyst by contacting the cumene and air at 90° C. for 1 hour. The cumene peroxide formation was monitored by a gas chromatography as seen in FIG. 12B.

Example 2

A straight run gas oil, properties of which are given in Table 3, was desulfurized using a process scheme similar to that described above with respect to FIG. 3.

The straight run gas oil was extracted in a counter-current extractor using furfural as solvent. The extractor was operated at 60° C., atmospheric pressure at a solvent to diesel ratio of 1.1/1.0. Two fractions were obtained: an aromatic-rich fraction and an aromatic-lean fraction. The aromatic-lean fraction yield was 68 W % and contained 3,500 ppmw of sulfur and 11.3 W % aromatics. The aromatic-rich fraction yield was 32 W % and contained 80 W % aromatics and 10,000 ppmw of sulfur.

The aromatic-lean fraction was hydrotreated in a fixed-bed hydrotreating unit a over conventional hydrotreating catalyst (Co—Mo on alumina) at 20 $Kg/cm^2$ hydrogen partial pressure, 320° C., liquid hourly space velocity of 2.0 $Kg/cm^2$ and at hydrogen to oil ratio of 280 Liters/Liters. The properties of hydrotreated straight run gas oil are given in Table 4. The hydrotreated gas oil contained less than 10 ppmw of sulfur.

TABLE 3

| Property | Unit | Method | SR Gas Oil |
| --- | --- | --- | --- |
| Density @ 15.6° C. | Kg/Lt | ASTM D4052 | 0.850 |
| SULFUR | W % | ASTM D4294 | 1.3 |
| NITROGEN | ppmw | | 178 |
| Aromatics | W % | | 31.5 |
| Paraffins + Naphthenes | W % | | 68.5 |
| Distillation | | ASTM D2892 | |
| IBP | ° C. | | 52 |
| 5 W % | ° C. | | 186 |
| 10 W % | ° C. | | 215 |
| 30 W % | ° C. | | 267 |
| 50 W % | ° C. | | 304 |
| 70 W % | ° C. | | 344 |
| 90 W % | ° C. | | 403 |
| 95 W % | ° C. | | 426 |
| 100 W % | ° C. | | 466 |

TABLE 4

| Property | Unit | Method | Aromatic Lean Fractions |
| --- | --- | --- | --- |
| Density @ 15.6° C. | Kg/Lt | ASTM D4052 | 0.8381 |
| SULFUR | W % | ASTM D4294 | 0.35 |
| NITROGEN | ppmw | ASTM D4629 | 91 |
| Aromatics | W % | | 28.5 |
| Paraffins + Naphthenes | W % | | 71.5 |
| Distillation | | ASTM D2892 | |
| IBP | ° C. | | 53 |
| 5 W % | ° C. | | 187 |
| 10 W % | ° C. | | 213 |
| 30 W % | ° C. | | 262 |
| 50 W % | ° C. | | 299 |
| 70 W % | ° C. | | 338 |
| 90 W % | ° C. | | 397 |
| 95 W % | ° C. | | 420 |
| 100 W % | ° C. | | 463 |

The aromatic-rich SR gas oil containing 10,000 ppmw of sulfur was subjected to air treatment at 90° C. in the presence of Co(Salophen) catalyst for a residence time of 1 hour to generate aromatic peroxides. The total mixture was then oxidized at 75° C. under atmospheric pressure for 2 hours with sodium tungstate as catalyst (0.5 W %) along with acetic acid as a phase transfer agent. The oxidation by products sulfones were removed by extraction and adsorption steps. The aromatic fraction, which contained less than 10 ppmw of sulfur after oxidation, extraction and adsorption steps, is then sent to diesel pool and combined with the hydrotreated aromatic lean fraction. The final gas oil fraction contained less than 10 ppmw of sulfur.

The method and apparatus of the present invention have been described above and in the attached drawings; however, modifications will be apparent to those of ordinary skill in the art and the scope of protection for the invention is to be defined by the claims that follow.

The invention claimed is:

1. A process for conversion of heteroatom-containing compounds in a hydrocarbon feedstock to their oxidation products comprising:
   separating the hydrocarbon feedstock into an aromatic-lean fraction and an aromatic-rich fraction;
   contacting the aromatic-rich fraction with an effective amount of gaseous oxidant and an effective quantity of catalyst effective to promote organic peroxide generation under conditions effective for organic peroxide generation and to produce a mixture containing organic peroxide and heteroatom-containing hydrocarbons, wherein the catalyst effective to promote organic peroxide generation includes a heterogeneous catalyst selected from the group consisting of Co(Salophen) and Co(Salophen) complexes;
   hydrotreating all or a portion of the aromatic-lean fraction;
   retaining the mixture containing produced organic peroxide and heteroatom-containing hydrocarbons under conditions effective for oxidative conversion of heteroatom-containing hydrocarbons into oxidation products of the heteroatom-containing hydrocarbons.

2. The process as claim 1, wherein contacting under conditions effective for organic peroxide generation and retaining the mixture containing produced organic peroxide and heteroatom-containing hydrocarbons for oxidative conversion of heteroatom-containing hydrocarbons into oxidation products of the heteroatom-containing hydrocarbons occur in separate vessels.

3. The process as in claim 2 wherein contacting under conditions effective for organic peroxide generation occurs in an organic peroxide generation apparatus.

4. The process as in claim 2 wherein retaining the mixture containing produced organic peroxide and heteroatom-containing hydrocarbons under conditions effective for oxidative conversion of heteroatom-containing hydrocarbons into oxidation products of the heteroatom-containing hydrocarbons occurs in an oxidative reaction apparatus.

5. The process as in claim 4 wherein a catalyst to promote oxidative conversion of heteroatom-containing hydrocarbons into oxidation products of the heteroatom-containing hydrocarbons includes one or more transition metal oxides.

6. The process as in claim 1, wherein contacting under conditions effective for organic peroxide generation and retaining the mixture containing produced organic peroxide and heteroatom-containing hydrocarbons under conditions effective for oxidative conversion of heteroatom-containing hydrocarbons into oxidation products of the heteroatom-containing hydrocarbons occur in a common vessel.

7. The process as in claim 6 wherein reactions in the common vessel occur in the presence of a bi-functional catalyst effective to both promote organic peroxide generation and to promote oxidation of heteroatom-containing hydrocarbon compounds reactions.

8. The process as in claim 1, further comprising removing oxidation products of sulfur-containing and nitrogen-containing hydrocarbon compounds from a hydrocarbon product stream.

9. The process as in claim 8, wherein removing oxidation products is by one or more of polishing, extraction, adsorption or decantation.

10. The process as in claim 1, wherein only the aromatic-rich fraction is contacted with an effective amount of gaseous oxidant.

11. The process as in claim 1, wherein the step of contacting the aromatic-rich fraction with an effective amount of gaseous oxidant occurs in an organic peroxide generation apparatus, and the step of retaining the mixture containing produced organic peroxide and heteroatom-containing hydrocarbons under conditions effective for oxidative conversion of heteroatom-containing occurs in a separate oxidative reaction apparatus.

12. The process as in claim 1, wherein the catalyst is Co(Salophen).

13. The process as in claim 1, wherein the catalyst is a Co(Salophen) complex.

* * * * *